April 6, 1965   G. K. A. SIGGELIN   3,176,446
CERAMIC GAS CONDITIONER
Filed May 27, 1963   2 Sheets-Sheet 1
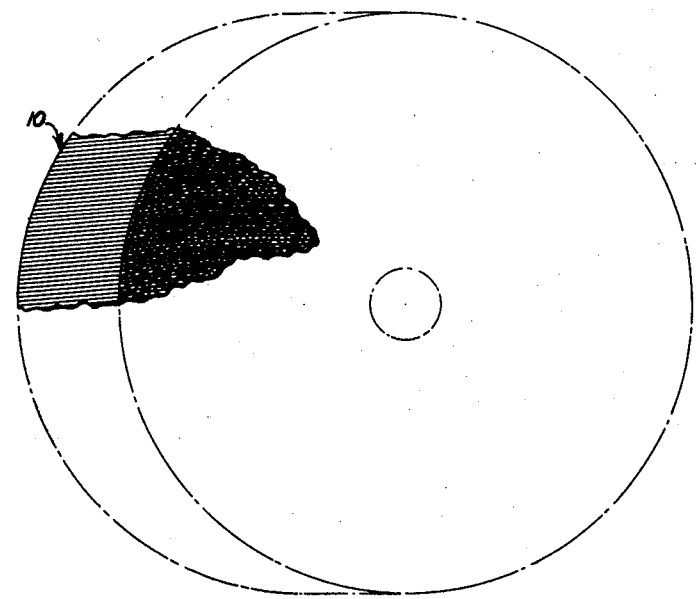
Fig. 1
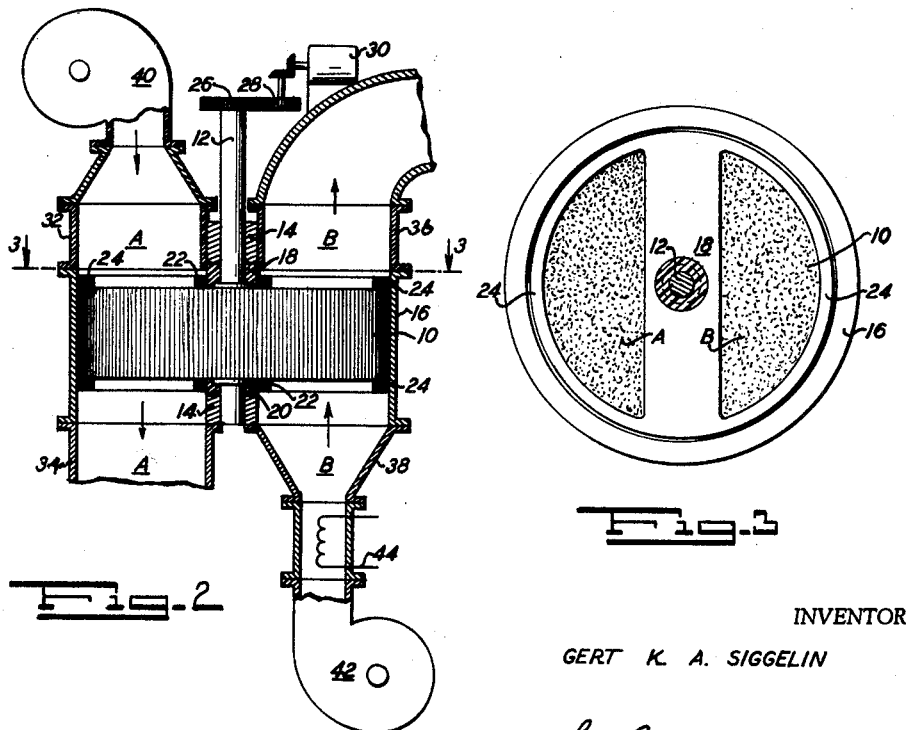
Fig. 2
Fig. 3
INVENTOR
GERT K. A. SIGGELIN
BY Sul B. Wicks
ATTORNEY April 6, 1965     G. K. A. SIGGELIN     3,176,446
CERAMIC GAS CONDITIONER
Filed May 27, 1963     2 Sheets-Sheet 2
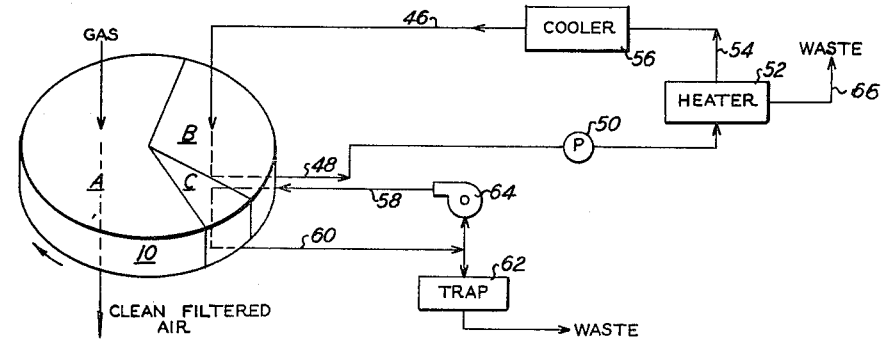
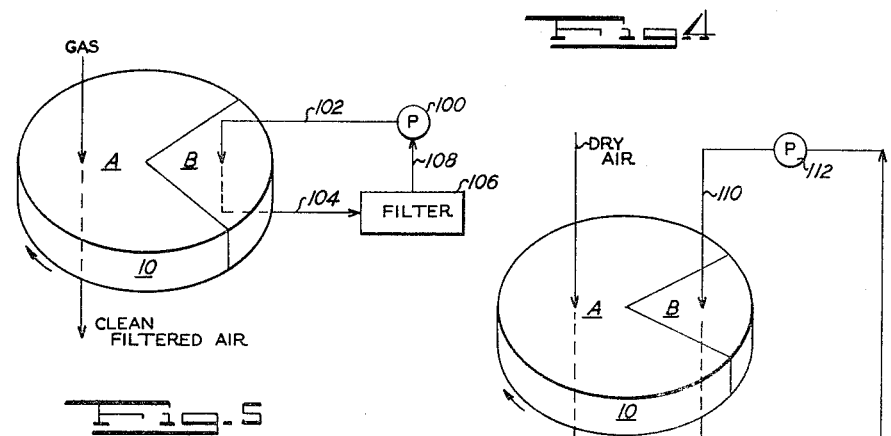
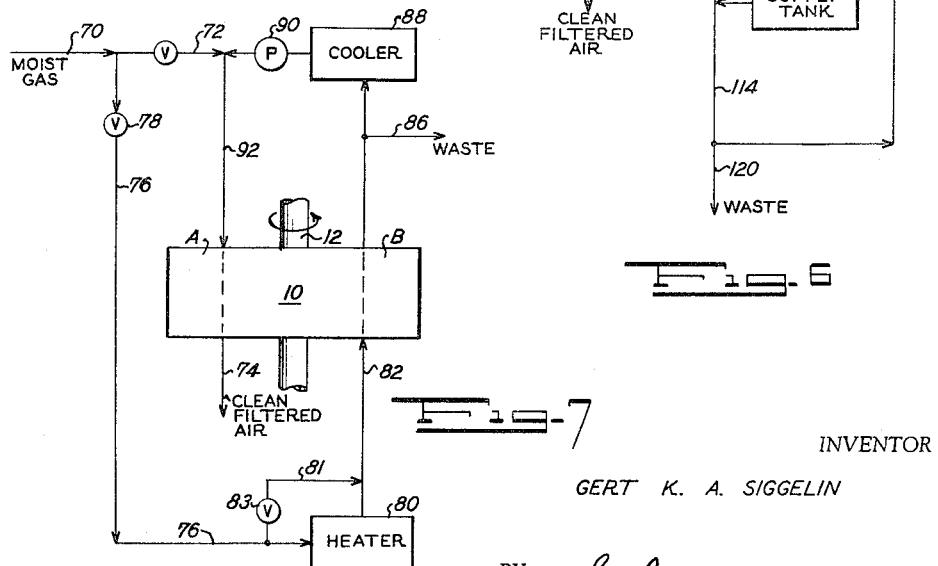
INVENTOR
GERT K. A. SIGGELIN
BY *Sol B. Wiese*
ATTORNEY

United States Patent Office 3,176,446
Patented Apr. 6, 1965

3,176,446
CERAMIC GAS CONDITIONER
Gert K. A. Siggelin, % A.B. Svenskaflåktfabriken,
Dept. U, P.O. Box 20040, Stockholm, Sweden
Filed May 27, 1963, Ser. No. 283,377
13 Claims. (Cl. 55—189)

This invention relates to an improved ceramic gas humidification modifier comprising an axially porous rigid ceramic body having gas-permeable cells extending in an axial direction through which gas is passed axially with very low pressure drop in passage through the ceramic body, the ceramic walls being substantially impermeable in a radial direction, being coated with and retaining a humidity modifying coating for humidity modification of gas such as air passed therethrough. The invention further includes humidity modification using such porous ceramic body with its rigid cellular wall structure coated with a humidity-modifying substance, procedure for so coating of such body including gas humidification and dehumidification and apparatus using such coated rigid porous ceramic body in gas humidification and dehumidification.

In broad aspect the invention comprises a structurally strong hard porous ceramic body having long ceramic cells of thin wall ceramic materials providing great porosity in an axial direction, the cellular ceramic walls being substantially non-porous and rugose in the radial direction. These cellular walls stably support and retain, for intimate gas contact with gas passed therethrough for moisture modification, a moisture-modifying internal coating upon the rugose cellular walls.

Such ceramic body is a strong, smooth, brittle, glassy substance formed by fusing normal ceramic-forming raw materials such as glass, sand, soda ash, borax, etc., including conventional modifying substances such as alumina, litharge and the like. The wet ceramic mix is ultimately heated to set to a hard rigid brittle ceramic body with large internal cells or pores running in one axial direction, the cellular walls being rough and readily coated with moisture-modifying coating substances while retaining their gas and moisture permeability characteristics. Typical ceramic bodies of the type useful herein to be coated for present purposes are available commercially under the trade name Cercor manufactured by Dow-Corning Company.

Such ceramic base, as is found, according to the present invention, may be used for carrying of coating films which modify the moisture content of gases passed therethrough while retaining its stated permeability. This is because the ceramic material is strong and rigid so that it is readily mechanically formed into a desired strong and rigid coating-supporting shape. It is a good heat conductor whereby it is useful in heat exchange and, most important for present purposes, it is relatively moisture impermeable in a radial direction, that is, in a lateral direction through its walls with respect to the normal direction of gas flow in passage therethrough. Moreover, it has strong physical ceramic properties which are not affected, softened or corroded, by adsorbed, absorbed or coated moisture in the cellular structure. Indeed, it is chemically inert to all usual coating substances that might normally be used in treatment of gases. Further, the coated ceramic product is outstanding because, due to its high porosity, it has good gas permeability in one direction, with little pressure drop for ready gas flow therethrough, and the large cellular pores are readily coated, and such coating is well retained therein until removed as desired and then easily replaced. Finally, the ceramic structure is inert to large heat variations and is resistant to any physical softening, hardening or warping by moisture absorbed or evolved in the heating, and is not a good bacterial or fungus growth supporting base, and is easily cleaned and sterilized. Consequently, the porous ceramic body hereof is ideal for the present purpose of moisture modification of gas passed therethrough.

In accordance with one phase of the present invention, the porous ceramic body is first given a coating for purposes of imparting moisture absorbency to the ceramic body of a desiccant salt metal. Such desiccant can consist of lithium chloride, magnesium chloride, calcium chloride, or the like, where a continuous wet coating of a liquid desiccant is to be maintained in the use of the product for moisture removal from gases. In another phase, the ceramic body is coated with water glass such as sodium or potassium silicate and the silica is precipitated as silica gel on the porous walls of the ceramic body by treating with acid or various precipitating salts to leave a highly porous adsorbent precipitate of silica gel after drying.

Alternatively, in a further phase, the porous ceramic body may be used for humidification, addition or moisture, of gases passed therethrough, and for this purpose the pores are coated with a thin film of an aqueous humectant, preferably water containing a polyhydric alcohol such as ethylene glycol, glycerol or lower glycol ethers such as diethylene glycol, triethylene glycol, and the like.

A ceramic body such as two types of Cercor is further described by way of example with the following physical characteristics, the data showing a range of physical characteristics available between products, first cast with a pore-forming agent and cured with heat, and another cast, drawn and then cured with heat, the drawn product being slightly modified.

| General: | | |
|---|---|---|
| Material Density (gr./cm.³) | 1.6 | 1.8 |
| Bulk Density (gr./cm.³) | 0.48 | |
| Porosity (Gas Permeability) | Permeable | Permeable |
| Porosity of Cell Wall (percent) | 35–40 | |
| Cell Wall Pore Volume (ml./gr.) calculated | 0.23 | |
| Open Frontal Area (percent) | 70 | |
| Thermal: | | |
| Melting Temp. (° C.) | 1,300 | 1,300 |
| Specific Heat (25° C., cal./gr.) | 0.22 | 0.22 |
| Mean Specific Heat (25–400° C., cal./gr.) | 0.24 | 0.24 |
| Linear Coefficient of Thermal Expansion ×10⁷ (25–300° C.) | −2 | −2 |
| Long Term Max. Operating Temp. (° C.) | 1,100 | 1,100 |
| Short Term Max. Operating Temp. (° C.) | 1,200 | 1,200 |
| Thermal Shock Resistance | Excellent | Excellent |
| Thermal Conductivity of Material (cal./cm.²/sec./cm./° C.) | 0.0047 | .0053 |
| Bulk Thermal Conductivity (cal./cm.²/sec./cm./° C.) | 0.00014 | |
| Mechanical: | | |
| Compressive Strength (p.s.i.) perpendicular to cell face | 2,000 | |
| Modulus of Elasticity (× 10⁶ p.s.i.) | | 5 |
| Modulus of Rupture (× 10³ p.s.i.) | | 7 |
| Poisson's Ratio | | 0.2 |
| Hardness, 100 gr. Knoop test | | 530 |
| Electrical: | | |
| Dielectric Constant (25° C., 8.6×10⁹ cps.) | 1.4 | 4.3 |
| Loss Tangent (25° C., 8.6×10⁹ cps.) | 0.0033 | 0.019 |

Several structures and coating procedures in which the porous ceramic body is used are illustrated by reference to the drawings herewith in which:

FIG. 1 illustrates in blown-up detail the structure of such cast ceramic body having numerous cellular pores extending axially from side to side, the cast body being in the shape of a thick disc;

FIG. 2 illustrates diagrammatically the mounting of such ceramic disc as a moisture adsorbent bed in a dehumidifier apparatus wherein the bed is rotated about an axis alternately, first through a dehumidification zone and then through a bed regenerating zone;

FIG. 3 is a plan view of a section through FIG. 2 taken on the line 3—3 of FIG. 2;

FIG. 4 is a diagrammatic illustration of a method of loading the ceramic body with a dehumidifier coating;

FIG. 5 is a diagrammatic illustration of the operation of the ceramic disc as a gas filter for trapping of dust upon wet liquid coated pores;

FIG. 6 illustrates in similar diagram the humidification of dry air by use of humectant coated pores; and FIG. 7 illustrates the use of the device for dehumidification in a high pressure gas system.

Referring first to FIG. 1, a ceramic body is shown which is available commercially as a high temperature ceramic kiln-cured mixture of said limestone, soda ash and borax, pyrolyzed at a temperature of about 1800° C. The raw ceramic materials are first mixed homogeneously into a fluid paste and then formed and set about pore-forming sticks, or cast about tubes or pins or wires to an intermediate stiffened condition, in the shape of a large thick disc of any selected dimensions. The porous disc is then cured, forming the pores by removing the wires and curing slowly to maintain its porosity while giving the ceramic substance a hard selected set, by pyrolyzing slowly at the set temperature. The slowly cooled porous ceramic product is then coated with the humidification modifying coating according to the following examples:

*Example I*

A commercial porous ceramic disc is dipped in a 45% aqueous solution of sodium silicate, drained and then dipped in 15% hydrochloric acid. The porous body with the precipitated silica gel therein is finally dried in an oven at 250° F. The product is then used as a dehumidifying bed.

The gel filled disc, as shown in FIG. 2, is mounted as a porous bed 10 about a central rotary shaft 12 supported between bearings 14 for rotation, in a dehumidifying housing 16. The housing has upper and lower seals dividing the disc 10 diametrically, usually but not necessarily, in equal halves (sections A and B). Such seals comprise an upper radial sealing member 18 and a corresponding lower sealing member 20, which carry elastic sealing rings 22 in direct gas sealing contact with the rotating porous ceramic bed 10 preventing gas transfer laterally thereby from one side A of the rotating bed to the neighboring side B; that is, preventing radial flow of the gas across the upper or lower surface of the rotating bed, and thus dividing the bed into dehumidifying section A and regeneration section B. Similarly, annular flexible seals 24 are mounted about the actual upper and lower peripheral edges of a bed to prevent gas flow around the outside of the rotating porous bed 10. The upper end of the central rotating shaft 12 is fitted with a driving gear 26 which meshes with a counter gear 28 driven by a motor 30 to slowly rotate the shaft 12 and bed 10 within the housing 16.

The upper and lower surfaces of the bed 10 are fitted with inlet 32 and outlet 34 gas ducts which conduct and remove gases to and from the rotating bed, the gas passing axially to and from the rotating bed at opposite sides of the bed. A corresponding outlet duct 36 and a regenerative inlet duct 38 are fitted to neighboring upper and lower halves of the bed, the bed halves being separated from each other by the seals 18 and 20. A wet air inlet blower 40 is provided to supply air to be dehumidified to the top inlet duct 32, and a wet air blower 42 is mounted below the bed to supply regeneration gas to the inlet duct 38 to pass up from the bottom for its regeneration. A heater element 44 is mounted in the duct 38 for heating of the regeneration gas.

The gas drying unit is operated according to the conventional dehumidifying and bed regenerating cycles as known in the art. Thus, the bed 10 comprising the porous ceramic body with moisture adsorbent silica gel in its pores is slowly rotated in the housing 16 between the dehumidifying section A of the unit and the regenerative section B of the unit. Moisture-containing gas, usually air, for dehumidification is continuously passed by blower 40 through the inlet duct 32 and thence into the dehumidifying section A of the slowly but continuously rotating bed 10. The gas is there dehumidified in passage axially through the pores in the rotating bed, and the dried gas leaves the system by way of duct 34 section A as, for example, dry air. Simultaneously, regeneration gas such as ambient air, which may be moist, is blown by lower blower 42 into duct 38 and is heated by electric coil 44, passing upward into the rotating bed at a regeneration temperature between 300 and 400° F., being blown upward in the direction of the arrow through the rotating bed 10, and thus regenerates the bed by vaporizing the adsorbed moisture in the silica gel in section B, passing the evolved moisture laden gas out through duct 36 out of the system. In this manner the bed is continuously regenerated and continuously re-used for removing more moisture from the gas as the bed rotates.

It will be observed that, due to substantial heat transfer available in the ceramic material, some of the heat in the rotating ceramic bed can be transferred to the relatively cold wet air being dehumidified so that the bed can operate both to remove moisture and as a heat transfer medium. Alternatively, as shown in a modification FIG. 4 described below, an additional section C can be provided in the disc, separated by seals, through which a cooling gas may be passed, cooling the bed before the bed returns as section A for further dehumidification. The ceramic body 10 comprising the bed is not affected by the moisture and continues to retain its initial or very high porosity.

This type of bed may also be used with a wet type of dehumidifier solution. For instance, a concentrated solution of lithium chloride or other deliquescent salt such as calcium or magnesium chlorides which have the property, as known in the art, to absorb moisture from air, may be coated upon the ceramic pores. Such system is shown diagrammatically in FIG. 4. In operation of the system, gas to be dried passes vertically downward through the porous bed 10 through a large section of such bed A. In the A section, the bed has been coated with wet, but non-dripping, film of concentrated lithium chloride, magnesium chloride, or calcium chloride solution in water. The bed is slowly rotated continuously as the gas passes downward in section A, the wet film absorbing moisture from the air. As the bed continues to rotate, the moisture laden portion of the bed enters a section B where the bed is now washed with more fresh deliquescent salt solution comprising, for example, concentrated lithium chloride, which is sprayed on the section B from a pipe 46. The cold substantially concentrated spray solution washes through the pores of the disc 10, displacing the formerly applied liquid coating, and replaces it with the fresh more concentrated solution comprising its substance. The displaced liquid lithium chloride solution is removed from the bottom of the section B through a pipe 48 and is passed by a pump 50 to a heater 52 which re-concentrates the solution by distillation back to original strong dehumidifying strength, removing some of the water thereby, and the hot desiccant solution passing through line 54 is then cooled in the cooler 56 and returned for further washing of section B through line 46. A section C is provided in the continuous rotary movement of the bed 10 in which a blast of any gas such as air is passed from a line 58, the air entering section C removing many loose droplets of liquid dehumidifying solution to prevent further dripping. The displaced liquid is picked up in a line 60 from the bottom section C and is removed from the system in a trap 62, the air being re-cycled by a blower 64 for re-use in section C. The wet thin coated porous bed 10 then continues its cycle through section A as being coated with fresh strong desiccant solution and thus continues the dehumidifying cycle. From time to time waste dehumidifying salt and dust trapped from the air are removed through line 66, and the contaminated solution is replaced with fresh desiccant solution, usually in the heater 52.

The system can also be operated to dehumidify air under high pressure; for instance, using a rotating disc apparatus sealed as in FIG. 2 and further illustrated in FIG. 7. The bed 10 is slowly rotated by a shaft 12 from a dehumidification section A through a regeneration section B and returned, as in FIG. 2. Gas, for example air, under high pressure, entering the system through a line 70 is passed through line 72 and thence through the dehumidification section A of the ceramic disc dehumidifier, coated as in Example 1 with silical gel, and leaves the disc as dried air under high pressure thorugh line 74. A small portion of the high pressure gas may be bled off into line 76 for regeneration of the regeneration section B of the bed 10, and for this purpose may have its pressure reduced by a pressure-reducing valve 78. If desired, the cold expanded gas may be heated first in a heater 80 before being passed through line 82 upward through the B section of the bed 10 for removal of the adsorbed moisture therein. The heater 80, however, is optional and not necessary, or the heat applied to the regeneration gas may be only sufficient to warm the scavenging gas to ambient temperature, such heat only offsetting any cooling due to the expansion of the gas either in line 76 or in the regeneration section of the bed B. The low pressure regeneration gas leaving the regeneration section B of the bed through line 84 may be wasted from the system through line 86, or it may be further cooled below its dew point in a cooler 88 to deposit its excess moisture on refrigerating coils therein, and then be re-compressed by a pump 90 and returned to the system by being re-cycled to the dehumidifying section of the bed by way of line 92. The strong ceramic porous bed is particularly useful in this arrangement because the ceramic supports the large pressure differential between neighboring sections of the bed 10, allows a large temperature differential in dehumidification in opposite sides of the bed, and further provides some heat transfer in the continuous rotating bed. The heater 80 may be by-passed by the regeneration gas via a line 81 controlled by a valve 83.

My moisture modifying system is further useful for merely filtering air, where, as shown in FIG. 5, gas is passed through a wet porous section A of the continuously rotating bed 10, and any dust is there removed from the gas, the dust being adhered to the wet porous surfaces of the disc. Moreover, the temperature of the gas being filtered can be modified to that desired in passage through the bed. The pores of the bed are coated with a liquid which readily traps the dust so that the porous ceramic body 10 in filtering both washes and modifies the temperature of the gas passed therethrough. For instance, the dust-trapping liquid being applied to the bed pores can be refrigerated to a desired temperature, cooling the ceramic bed as well as the gas, which is thus cooled, filtered, and washed in passing through section A of such rotating bed. The filtering and washing liquid applied to the disc in section B of the bed in its continuous rotation may be a stable liquid such as glycerin or ethylene glycol. It is continuously circulated by a pump 100 by way of line 102, being sprayed upon and washing through section B. The wash liquid is then recycled by a line 104 to filter 106, which removes any dust, returning the clean liquid by line 108 and pump 100 by way of line 102 to section B. The wash liquid applied to section B may be heated or cooled as shown in FIG. 4. Moreover, as shown in FIG. 4, an additional section C may be provided in the bed for blowing out excess liquid before it enters the gas filtering and conditioning section A.

My system may be operated with the further advantage of adding moisture, that is, humidifying the gas passed through section A while filtering and cleaning it. For this purpose, as shown in FIG. 6, the porous ceramic bed 10 is again rotated through a filtering and humidifying section A in which dry air or other dry gas is continuously passed axially through the bed. The pores of the bed are coated with a humectant solution such as a 10% solution of glycerin in water from which the dry air absorbs moisture in axial passage therethrough, and leaves as a conventionally humidified wet air. In passage, the gas deposits any dust on the liquid surfaces, being in effect washed in contact therewith. The rotating bed 10 then enters a section B is which it is continuously washed with the humectant solution entering through a line 110 as impelled by a pump 112 drawing humectant solution from a line 114, part of which is obtained as re-cycle removed from the bottom section B of the bed 10 by way of line 116, and part or all of which may be supplied from a supply tank 118. As before, the temperature of the gas being conditioned may be controlled by the temperature of the bed and by the temperature of the humectant liquid. Various methods of adjusting the water content of the humectant may be used; for instance, a part of the contaminated humectant solution can be wasted through line 120, or the humectant solution can be regenerated by distillation (not shown).

As thus described, I have provided an axially porous hard ceramic body commercially available as such with the characteristics described above, in which the ceramic is coated and is porous in the axial direction. That body is coated with a gas modifying substance either to remove or supply moisture to the gas passed therethrough, or to more effectively remove impurities from the gas, filtering and depositing such impurities or moisture upon the coating in the ceramic body. That ceramic body may be continuously washed with fresh solution of adjusted temperature to remove or replenish moisture adsorbed in or removed from the old coating, replacing the coating with fresh solution for dehumidifying, humidifying or gas washing and temperature controlling purposes. The waste solutions may be regenerated and returned as fresh coating on the pores of the ceramic disc for its intended purpose as fresh solution or as a fresh coating substance; or the bed may be operated to regenerate it by passing a scavenging gas through it, removing moisture according to standard handling procedures for regenerating a rotating bed.

Great advantages are available in the present construction by the strength of the ceramic body, by its unidirectional control of the gas to pass axially thereof, by the ceramic body capability of withstanding high pressure differentials, and by being resistant to heat shock while being of controllable heat exchange substance. It is also resistant to corrosion by moisture and chemical contaminants in the gas. It has a good gas filtering function and readily supports a coating substance in a wet coating for thorough contact of small portions of the gas therewith in passage through the ceramic body.

Certain modifications will occur to those skilled in the art, and, accordingly, it is intended that the description given here be regarded as illustrative and not limiting except as defined in the appended claims hereto.

I claim:

1. A rigid ceramic gas moisture modifying body, said body having a large plurality of elongated thin contiguous porous cells, extending longitudinally from one side of said body to an opposite side, the said body being gas permeable in the longitudinal direction for substantially unimpeded gas flow therethrough, the cellular walls thereof being substantially gas impermeable in a lateral direction, said walls supporting and the cellular pores thereof containing a moisture interchange substance adapted to impart or receive moisture passed to or removed from a gas passed longitudinally through said body.

2. A rigid ceramic gas moisture modifying body as defined in claim 1 wherein the moisture interchange substance coats in the porous cells and comprises a desiccant substance adapted to absorb water vapor from the gas in longitudinal passage through said body.

3. A rigid ceramic gas moisture modifying body as defined in claim 1 wherein the porous cells contain precipitated silica gel adapted to adsorb water vapor from the gas in longitudinal passage through said body.

4. A rigid ceramic gas moisture modifying body as defined in claim 1 wherein the porous cells are wet with a concentrated desiccant solution of a salt selected from the group consisting of a chloride of calcium, magnesium and lithium adapted to adsorb water vapor from the gas in longitudinal passage through said body.

5. A rigid ceramic air moisture modifying body as defined in claim 1 wherein the porous cells are coated with an aqueous humectant adapted to impart water vapor to and to wash the gas passed through said body.

6. Apparatus for modifying the moisture content of gases comprising a rotary rigid ceramic moisture modifying disc, said disc having a large plurality of elongated thin contiguous porous cells extending longitudinally from one side to an opposite side of said disc, said disc being gas permeable in the longitudinal direction for substantially unimpeded gas flow therethrough, the cellular walls thereof being substantially gas impermeable in the lateral direction, said walls supporting and the cellular pores thereof containing a moisture interchange substance, radial sealing means mounted across each side of said disc dividing the disc as it rotates into independent gas treating and disc regenerating zones, means for slowly rotating said disc through said zones, means for passing gas whose moisture is to be modified through the gas treating zone, the gas in said treating zone being passed longitudinally from one side of said disc continuously as it rotates to modify its moisture content in passage through said disc, and means for withdrawing the moisture modified gas from the opposite side of said rotating disc in the said treating zone, and means for simultaneously regenerating the moisture modifying characteristics of said disc as it passes through said disc regenerating zone.

7. Apparatus as defined in claim 6 wherein the moisture modifying substance is a desiccant and the means for regenerating said disc comprises means for passing hot regeneration gas longitudinally through said disc as it rotates through the said regeneration zone, the hot regeneration gas vaporizing, displacing moisture from the rotating disc, and means for withdrawing the vapor laden regeneration gas from said apparatus.

8. Apparatus as defined in claim 6 wherein the pores of said disc have a hydrous oxide selected from the group consisting of silica and alumina deposited therein, and the means for regenerating said disc comprises means for passing hot regeneration gas longitudinally through said disc as it rotates through the said regeneration zone, the hot regeneration gas vaporizing, displacing adsorbed moisture from the rotating disc, and means for withdrawing the vapor laden regeneration gas from said apparatus.

9. Apparatus as defined in claim 6 wherein the moisture modifying substance is a wet desiccant salt solution and the means for regenerating said rotating disc comprising means for washing said disc with fresh concentrated deliquescent salt solution, said wash displacing the used wet desiccant coating and replacing the same with fresh desiccant coating.

10. Apparatus as defined in claim 6 wherein the moisture modifying substance is a concentrated aqueous solution of a desiccant salt selected from the group consisting of lithium chloride, calcium chloride and magnesium chloride, and the means for regenerating said rotating disc comprising means for applying said solution to the disc in said regenerating zone as a washing liquid to remove and replace the used moisture modifying liquid with which the disc was coated, said apparatus further including means for regenerating the desiccant liquid.

11. Apparatus as defined in claim 6 wherein the moisture modifying substance in the pores of said disc is a wet aqueous solution of a humectant and the means for regenerating said rotating disc comprises means for washing said disc with fresh humectant solution, displacing the used wet coating from the pores of said disc and replacing the same with fresh humectant coating.

12. Apparatus for removing the moisture from gases under high pressure comprising a strong rigid rotary mounted porous ceramic disc containing desiccant substances in the pores thereof, said disc having a large plurality of elongated thin contiguous porous cells extending longitudinally from one side to an opposite side of said disc, the said disc being gas permeable in the longitudinal direction for substantially unimpeded gas flow therethrough, the cellular walls thereof being substantially gas impermeable in a lateral direction, radial sealing means mounted across the opposite surfaces dividing the disc into separate moisture removal and regeneration zones, means for slowly rotating said disc through said zones, means for passing gas under high pressure through said moisture removal zone of said disc, said gas entering one side and being removed from the opposite side in longitudinal passage through said disc continuously as it rotates through said zone to reduce the moisture content thereof, means for withdrawing the dried gas under high pressure from the said opposite side of said rotating disc in the said gas drying zone, means for longitudinally passing a regeneration gas under low pressure through said regeneration zone, and means for removal of the moisture laden regeneration gas from the system at the opposite side of said regeneration zone.

13. Apparatus as defined in claim 12 including means withdrawing some of the high pressure inlet gas to be dehumidified, means for reducing the pressure of the withdrawn portion of the gas and means for passing said low pressure gas to one side of the bed in the regeneration zone as regeneration gas for removing moisture from said bed.

References Cited by the Examiner
UNITED STATES PATENTS

| | | | |
|---|---|---|---|
| 1,173,187 | 2/16 | Hechenbleikner | 261—94 |
| 1,425,790 | 8/22 | Moyer | 55—388 X |
| 1,482,626 | 2/24 | Whiting | 55—388 |
| 1,740,351 | 12/29 | Isobe. | |
| 2,298,294 | 10/42 | Hughes | 261—94 X |
| 2,502,137 | 3/50 | Fleisher. | |
| 2,665,769 | 1/54 | Walker et al. | |
| 2,700,537 | 1/55 | Pennington | 55—78 |
| 2,796,145 | 6/57 | King | 261—92 X |
| 2,879,979 | 3/59 | Wheeler | 261—92 |
| 2,925,880 | 2/60 | Munters | 55—390 X |
| 2,946,201 | 7/60 | Munters | 55—34 |
| 2,993,563 | 7/61 | Munters et al. | 55—34 |

FOREIGN PATENTS 216,708  6/24  Great Britain.

REUBEN FRIEDMAN, *Primary Examiner.*